United States Patent [19]

Capper et al.

[11] Patent Number: 5,521,616
[45] Date of Patent: May 28, 1996

[54] CONTROL INTERFACE APPARATUS

[76] Inventors: David G. Capper, 49 Edwards Ave., Sausalito, Calif. 94965; Stan Axelrod, 9598 Glenwood Rd., Port Orchard, Wash. 98388

[ * ] Notice: The term of this patent shall not extend beyond the date of Pat. No. 5,288,078.

[21] Appl. No.: 198,325

[22] Filed: Feb. 18, 1994

Related U.S. Application Data

[63] Continuation of Ser. No. 914,640, Jul. 16, 1992, Pat. No. 5,288,078, which is a continuation of Ser. No. 258,157, Oct. 14, 1988, abandoned.

[51] Int. Cl.$^6$ .................................................. G09G 5/00
[52] U.S. Cl. ........................................ 345/156; 273/148 B
[58] Field of Search ................................ 345/156, 158, 345/175; 273/148 B, 856, 434, 438, 311, 312, 358, 460, 316, DIG. 28; 250/201, 206, 208, 209, 216, 221, 573, 574, 578

[56] References Cited

U.S. PATENT DOCUMENTS

| | | |
|---|---|---|
| 3,504,334 | 3/1970 | Turnage . |
| 3,792,243 | 2/1974 | Appel et al. . |
| 3,838,212 | 9/1974 | Whetsone et al. . |
| 3,886,361 | 5/1975 | Wester . |
| 4,111,421 | 9/1978 | Mierzwinski . |
| 4,137,651 | 2/1979 | Pardes et al. . |
| 4,210,329 | 7/1980 | Steiger et al. . |
| 4,309,781 | 1/1982 | Lissau . |
| 4,317,005 | 2/1982 | de Bruyne . |
| 4,414,537 | 11/1983 | Grimes . |
| 4,517,559 | 5/1985 | Deitch et al. . |
| 4,521,772 | 6/1985 | Lyon . |
| 4,521,870 | 6/1985 | Babbel et al. . |
| 4,524,348 | 6/1985 | Lefkowitz . |
| 4,542,291 | 9/1985 | Zimmerman . |
| 4,545,583 | 10/1985 | Pearman et al. . |
| 4,550,250 | 10/1985 | Mueller et al. . |
| 4,564,928 | 1/1986 | Glenn et al. . |
| 4,565,999 | 1/1986 | King et al. . |
| 4,578,674 | 3/1986 | Baker et al. . |
| 4,654,648 | 3/1987 | Herrington et al. . |
| 4,682,159 | 7/1987 | Davison . |
| 4,695,953 | 9/1987 | Blair et al. . |
| 4,713,545 | 12/1987 | Norrgren et al. . |
| 4,771,344 | 9/1988 | Fallacaro et al. . |
| 4,782,328 | 11/1988 | Denlinger . |
| 4,791,416 | 12/1988 | Adler . |
| 4,796,019 | 1/1989 | Auerbach . |
| 4,799,687 | 1/1989 | Davis et al. . |
| 4,837,430 | 6/1989 | Hasegawa . |
| 4,910,464 | 3/1990 | Trett et al. . |
| 4,924,216 | 5/1990 | Leung . |
| 5,288,078 | 2/1994 | Capper et al. ................ 273/148 B |

FOREIGN PATENT DOCUMENTS

| | | |
|---|---|---|
| 60-69728 | 4/1985 | Japan . |
| 62-14528 | 1/1987 | Japan . |
| 63-167534 | 7/1988 | Japan . |

OTHER PUBLICATIONS

Scientific America, Oct. 1987; Interfaces for Advance Computing by James D. Foley, pp. 127–135 (USA).

*Primary Examiner*—Richard Hjerpe
*Assistant Examiner*—Regina Liang
*Attorney, Agent, or Firm*—Kolisch, Hartwell, Dickinson, McCormack & Heuser

[57] ABSTRACT

This invention comprises a control interface between a machine and a physical object. The invention includes an infrared transmitter for transmitting a first infrared signal to an object. Upon striking the object, the infrared signal is reflected forming a reflected infrared signal. An infrared receiver receives the reflected signal from the object and the reflected signal is transformed into a second signal, which may be either an analogue type or a yes/no threshold type, representative of a distance between the object and the receiver. The second signal is coupled to the machine. The apparatus is a cordless touch-free controller interface for use with a machine. The present invention is ideally suited for controlling cursor position for use with computers and also with video games.

13 Claims, 6 Drawing Sheets

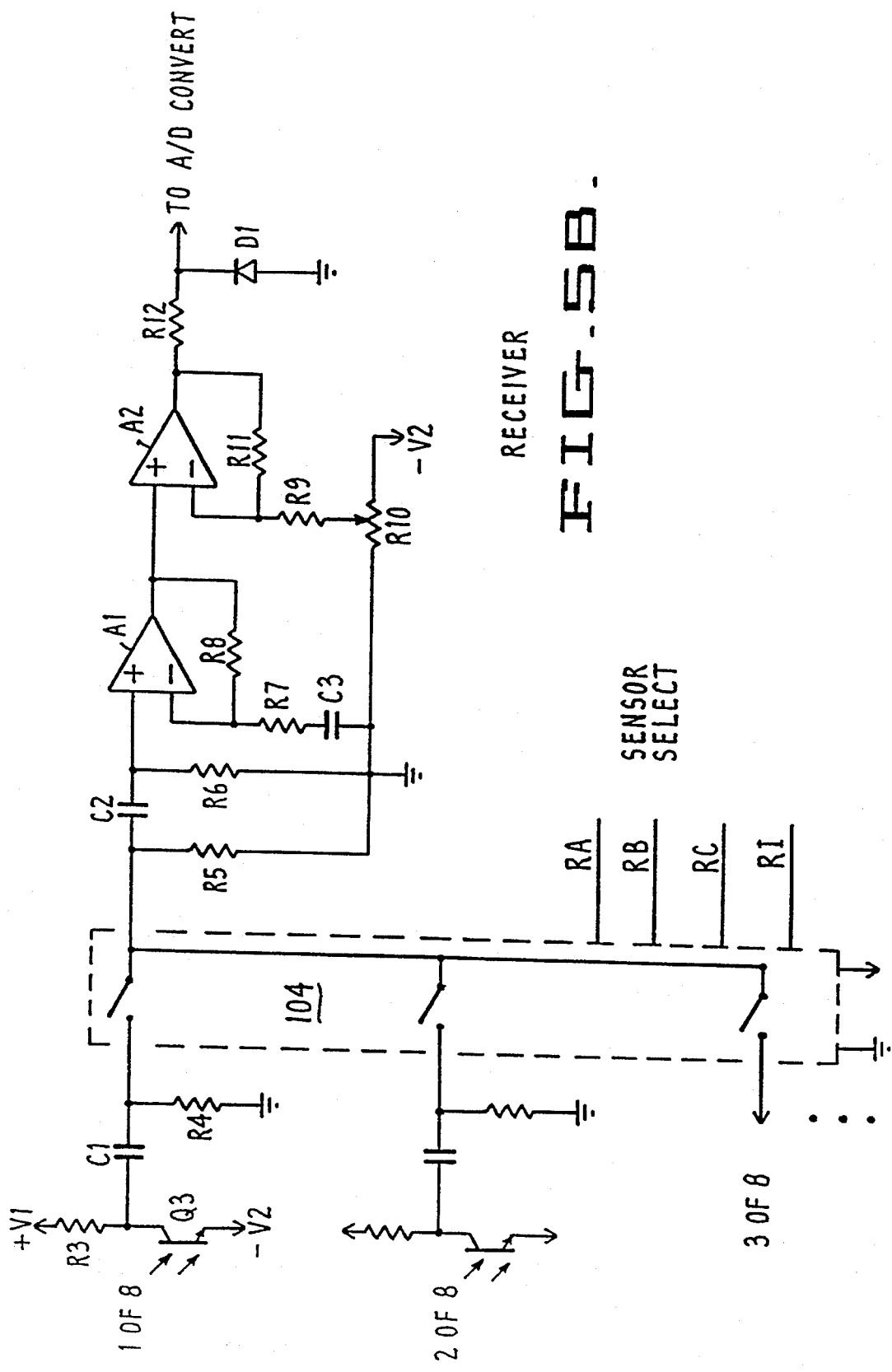

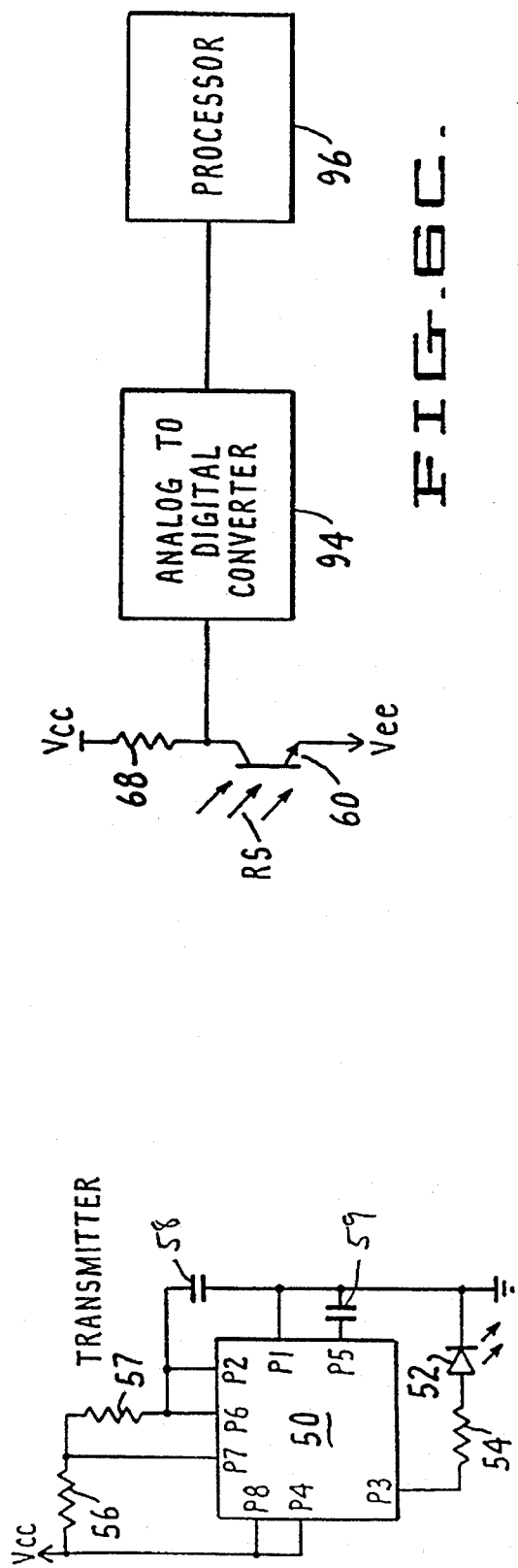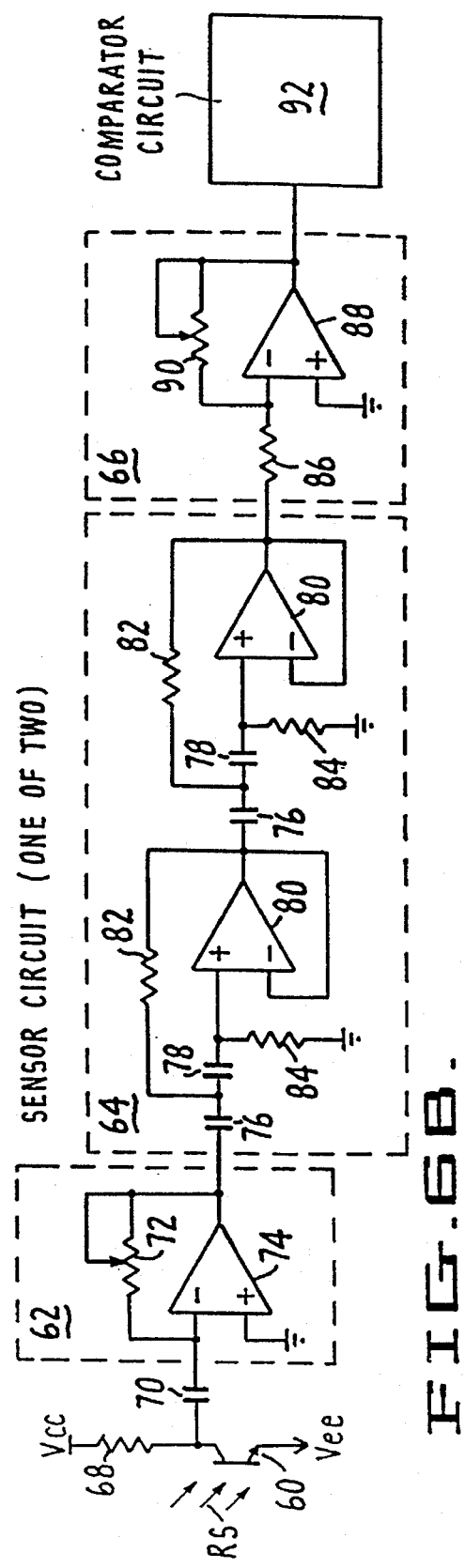

CONTROL INTERFACE APPARATUS

This is a continuation of application Ser. No. 07/914,640, filed Jul. 16, 1992, now U.S. Pat. No. 5,288,078, which was a file-wrapper continuation of application Ser. No. 07/258,157 filed on Oct. 14, 1988, now abandoned.

A portion of the disclosure of this patent document, an Appendix, contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The material is protected under U.S. Copyright Law by the notice "Copyright Axelrod 1988."

FIELD OF THE INVENTION

This invention relates to the field of a control interface for computer or video game. More particularly, this invention relates to determining the location of an object, such as a human hand, using infrared radiation transmission and reception. The apparatus disclosed and claimed is capable of operating selectively in such a way that location determination can be used to generate not only "threshold" (yes/no) type control signals, but also "analogue" (non-yes/no) type control signals.

BACKGROUND OF THE INVENTION

Controlling the position of a cursor is important when using certain types of machines such as a computer or video games. Cursors have been controlled by keyboard keystrokes. Improved ergonomic interfaces including a joystick, mouse and trackball. Using these devices, a computer operator has a better "feel" for adjusting cursor position relative to control operation. However, each of these devices requires the operator to move a physical object which is hard wired to the machine. Such a practice can be cumbersome or inefficient requiring the operator to retrieve and deposit the object for each use.

There are other non-keyboard devices which must be moved for controlling a cursor. These devices include such means measuring the doppler shift, combining infrared and ultrasonic transceivers, transmitting light from a light pen at the display screen, or affixing a radio transmitter or receiver to the head of the user. Such methods and devices are shown in Baker, eta., in U.S. Pat. No. 4,578,764, King et al., in U.S. Pat. No. 4,565,999, Davison, U.S. Pat. No. 4,682,159, Herrington et al., U.S. Pat. No. 4,645,648, and Mueller et al., U.S. Pat. No. 4,550,250.

Lefkowitz, in U.S. Pat. No. 4,524,348, discloses a cordless control interface between a physical object such as a part of the human body, and a machine. Movement of the physical object in a defined field is sensed, and signals corresponding to such movement are received, detected, amplified and produced as an input signal to the machine to move an element of the machine in the same direction as, and in an amount proportional to, movement of the object. In one embodiment, the machine is a video game system and the element is a display signal.

The Lefkowitz apparatus comprises planar antennas, such as sheets of metal and the antenna is coupled to a detunable oscillator. If a physical object, such as a human hand, is placed into the field of the oscillator, the presence of the hand due to body capacitance is communicated to a tuned circuit in the form of added capacitance to the combination of circuit capacitance causing an alteration in the frequency of the active oscillator. Such alteration is in the form of the lowering the operating frequency. Accordingly, the position of the hand is sensed. By moving the hand, the capacitance changes.

The sensed object is electrically coupled as a capacitance into the circuit of Lefkowitz through one or more antennas. The position of an electrically inert object, having no ability to effect the capacitance of the system, cannot be detected and located. Therefore, electrically inert objects cannot be used to control a cursor using Lefkowitz. In certain applications, such as video or computer games, a player may wish to wield an object, such as a sword, baseball bat or the like, to enhance the realism of play. Where such objects are electrically inert for safety or other reasons the object cannot be sensed.

The oscillations are typically in the radio frequency range. Accordingly, these devices are expensive to manufacture. Further, governmental restrictions are placed upon radio frequency devices requiring adherence to government restrictions.

An ideal cordless cursor control device would merely sense the position of any physical object, for example, the operator's hand without requiring the operator to move an object or requiring the use of expensive radio frequency oscillators. Such a device would be extremely easy for the user to operate. Further, such a device would greatly simplify and enhance the playing of video games.

SUMMARY OF THE INVENTION

This invention comprises a control interface between a machine and a physical object. The invention includes an infrared transmitter for transmitting a first infrared signal to an object. Upon striking the object, the infrared signal is reflected forming a reflected infrared signal. An infrared receiver receives the reflected signal from the object and the reflected signal is transformed into a second signal representative of a distance between the object and the receiver. The second signal, which may be either an analogue type, or a yes/no threshold type, is coupled to the machine. The apparatus is a cordless touch-free controller interface for use with a machine. The present invention is ideally suited for controlling cursor position for use with computers, video games or other display devices.

BRIEF DESCRIPTION OF THE DRAWINGS

FIG. 5B is a schematic diagram of the receiver of the preferred embodiment.

FIG. 6A is a schematic diagram of the transmitter of an alternate embodiment of the present invention.

FIG. 6B is a schematic diagram of the receiver of an alternate embodiment.

FIG. 6C is a block diagram of a second alternate embodiment of the receiver circuit.

DETAILED DESCRIPTION OF THE PREFERRED EMBODIMENT

Figure 1:
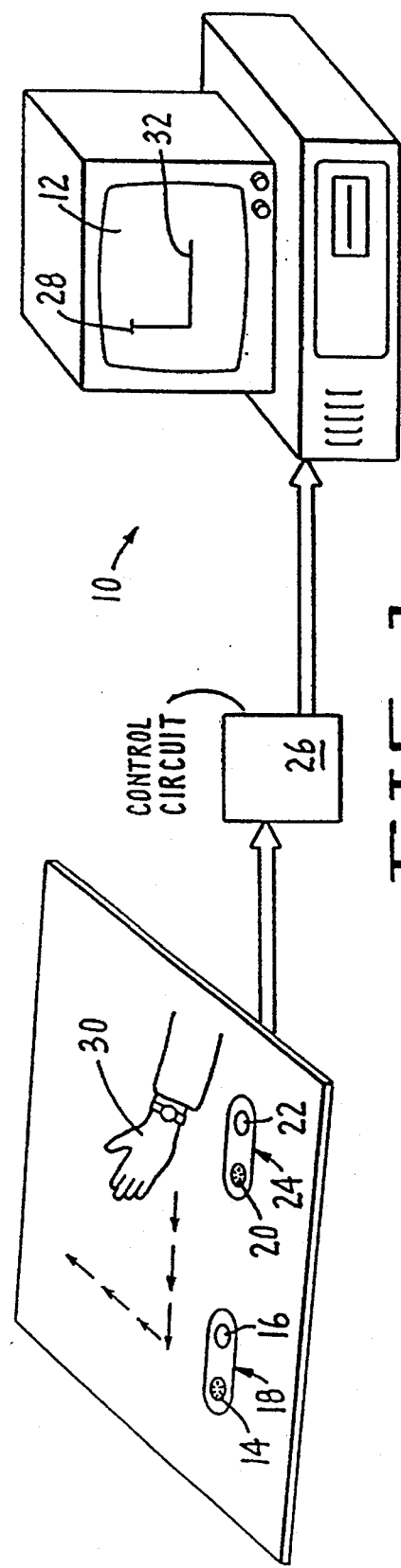
FIG. 1 shows a perspective view of one embodiment of the preferred embodiment of the present invention.

FIG. 1 shows a first embodiment of the present invention. A computer device 10 having a display screen 12 is shown. A first infrared transmitter 14 is associated with a first infrared receiver 16 forming an infrared transceiver 18. Similarly, a second infrared transmitter 20 is associated with a second infrared receiver 22 forming an infrared transceiver 24. Each transceiver 18 and 24 is coupled to a control circuit 26. The control circuit 26 is coupled to the computer 10 to control the cursor 28 on the screen 12.

In FIG. 1, the hand of the operator 30 is shown to move first to the left and then in an upward direction. If the computer 10 is operating in a conventional display mode, the cursor will traverse a path on the screen 12 mimicking (illustrated at 32) the path traversed by the movement of the operator's hand.

Figure 2:
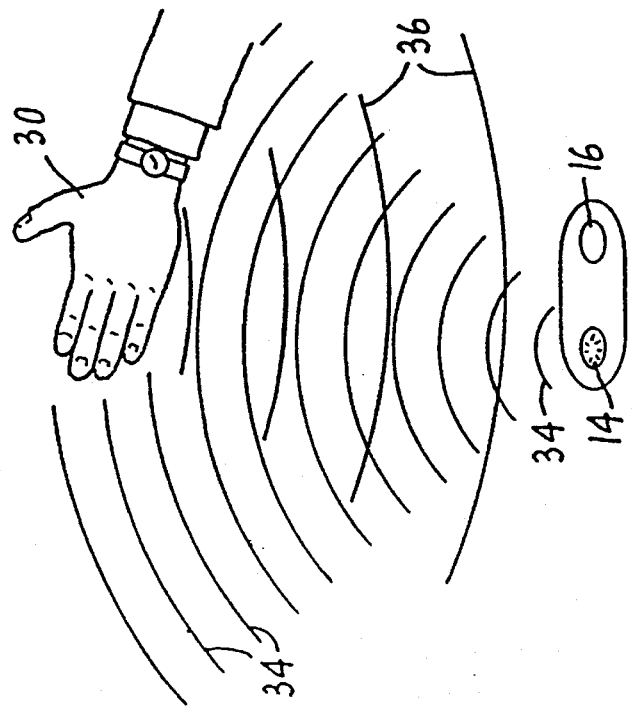
FIG. 2 shows a detailed view of a portion of the embodiment of FIG. 1.

FIG. 2 shows a more detailed view of the infrared transmitter 14, the infrared receiver 16 and the operator's hand 30. In the preferred embodiment, the transmitter 14 is an infrared light emitting diode (LED) and the receiver 16 is a photo transistor. The receiver 16 could also be a photo diode. In addition, FIG. 2 shows a representation of the transmitted infrared radiation 34 and the reflected radiation 36. The infrared radiation 34 is transmitted from the infrared transmitter 14. The radiation is transmitted in all directions. For certain applications, the transmitted radiation might be columnized using lenses. Some portion of the transmitted radiation 34 will strike the operator's hand 30. That portion of the radiation striking the operator's hand will be reflected, also in all directions.

The strength of radiation is proportional to the distance from the source of the radiation. Accordingly, the amount of radiation received by the infrared receiver 16 is proportional to the distance that the radiation travels from the infrared transmitter 14 to the operator's hand plus the distance from the operator's hand to the infrared receiver 16, i.e., the path of the infrared signal from the transmitter to the receiver. Certain applications may require a radiation shield between the transmitter and receiver to prevent false readings.

The system of FIG. 1 shows transceiver 18 and transceiver 24 mounted into a single line in a planar surface. The distance of the operator's hand from each transceiver represents a location on the computer screen 12. A third transceiver pair could be mounted into the plane of the other two transceivers but not in the same line relative to three dimensional space. In the alternative, the transceivers could be mounted in planar surfaces oriented perpendicular to one another. In such an embodiment the cursor would be controlled by the distance of the object from each planar surface.

Figure 3:
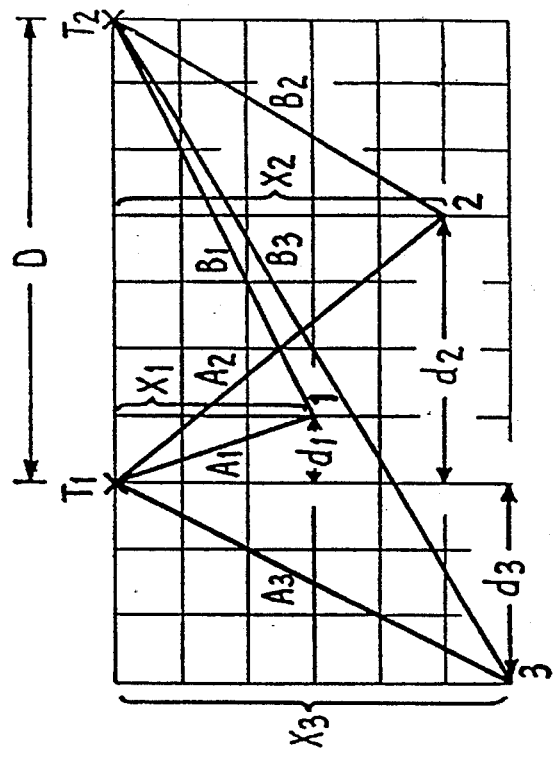
FIG. 3 shows a schematic diagram of the embodiment of the invention of FIG. 1.

FIG. 3 shows two transceivers $T_1$ and $T_2$ mounted in the same plane. To determine the distance of the hand 30 from a plane defined by the transceivers $T_1$ and $T_2$ in an ideal system, the following equations are used.

$$A_n^2 = X_n^2 + d_n^2$$
$$B_n^2 = X_n^2 + (D - d_n)^2 = X_n^2 + D^2 - 2Dd_n + d_n^2$$

-continued
$$A_n^2 - B_n^2 = -D^2 + 2Dd_n$$
$$\therefore d_n = (A_n^2 - B_n^2 + D^2)/2D$$
$$X_n = (A_n^2 - d_n^2)^{1/2}$$
$$= (A_n^2 - ((A_n^2 - B_n^2 + D^2)/2D)^2)^{1/2}$$

$A_n$ is the distance of the hand from the first transceiver $T_1$ measured as a function of the strength of the signal received by the first transceiver.
$B_n$ is the distance of the hand from the second transceiver $T_2$ measured as a function of the strength of the signal received by the second transceiver.
$X_n$ is the distance of the hand from the plane defined by the transceivers $T_1$ and $T_2$.
$d_n$ is the distance from the transceiver $T_1$ and the projection of the location of the hand on the plane defined by the transceivers $T_1$ and $T_2$.
$D$ is the distance between transceivers $T_1$ and $T_2$.

EXAMPLE 1

$d_1 = 1 \approx ((3.16)^2 - (6.71)^2 + 49)/14$
$x_1 = 3 \approx ((3.16)_2 - (1)^2)^{1/2}$

EXAMPLE 2

$d_2 = 4 \approx ((6.4)^2 - (5.83)^2 + 49)/14$
$x_2 = 5 \approx (6.4^2 - 4^2)^{1/2}$

EXAMPLE 3

$d_3 = -3 \approx ((6.71)^2 - (11.66)^2 = 49)/14$
$x_3 = 6 \approx (6.71)^2 - (-3)^2$ Using the Pythagorean Theorem, these equations show that both lateral distance along and distance from the surface in which both transceivers are mounted can be measured using these two transceivers, $T_1$ and $T_2$. Referring to FIG. 3, the distance D between the two transceivers is always a constant. The two distances $A_n$ and $B_n$ of a given point from the two transceivers is measured using the relative strength of the signals received at each of the transceivers. Accordingly, we have two equations and two unknowns, $X_n$ and $d_n$. Using a third such transceiver mounted out of the line connecting $T_1$ and $T_2$ one can determine three dimensional spacing for applications requiring such information, such as mechanical CAD design or certain video games.

No system will be ideal. An operator's hand located within the volume of space sensed by the present invention will be represented on the display screen at a particular location. As the operator's hand is moved and positioned in a new location the relative analogue change in position will be displayed on the screen. More precise position identification can be obtained through the use of precision components, infrared lenses and circuitry.

In some applications, the infrared signals from a first transceiver after striking the operator's hand and thereby forming a reflected signal may inadvertently strike a second, unintended transceiver forming a false indication of location. Three possible ways to avoid such a false reading include: 1) having each transceiver operate within a unique segment of the infrared portion of the electromagnetic spectrum, 2) collimate the signals sent and received with optical lenses and 3) alternately pulse each transceiver for a predetermined length of time.

For example, in the embodiment of FIG. 1, each transceiver could be turned on for 100 milliseconds and then turned off for the same length of time. The other transceiver would be turned on when the first transceiver is turned off and vice versa. For three dimensional applications, each transceiver could operate for one-third of the duty cycle. Because infrared radiation travels at the speed of light, approximately 186,000 miles per second, only very short operating cycles are needed to pinpoint the location of the operator's hand with reasonable accuracy. In this way, inexpensive electronic components can be utilized and still maintain high accuracy of cursor control.

Figure 4:
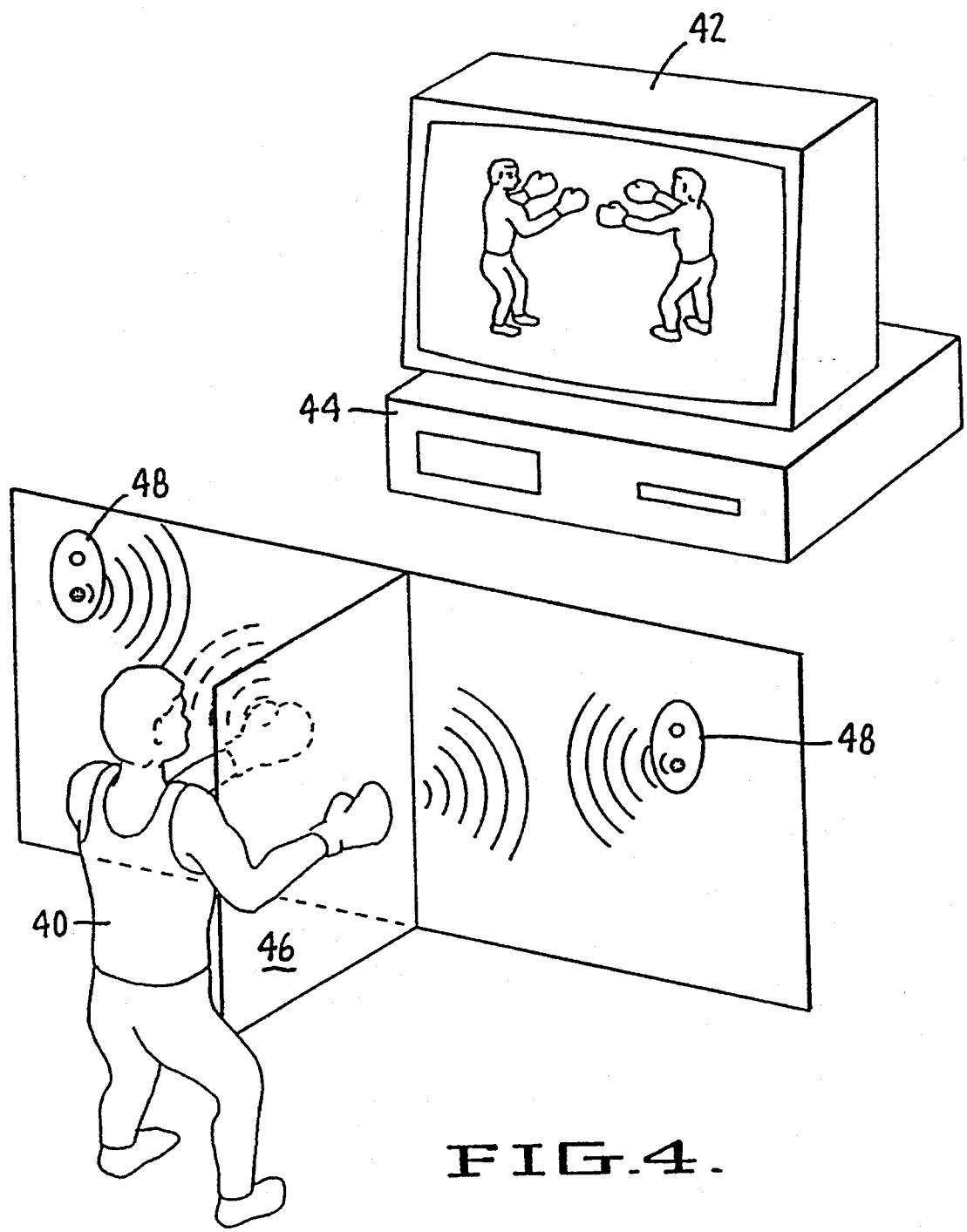
FIG. 4 shows a perspective diagram of an alternate embodiment of the present invention.

In some applications, it may be desirable for a cursor control device to sense the location of more than one object. In the preferred embodiment of the present invention, the cursor control device may be utilized with a Nintendo video game device. Nintendo is a trademark of Nintendo of America, Inc. If for example, the Mike Tyson Punch Out game is used, it may be necessary to sense each of the "boxer's" hands separately. In FIG. 4, the player 40 is positioned in order to see the display 42. The display 42 is controlled in the usual manner by the video game device 44 which in some circumstances may be a personal computer. The display 42 shows, among other things, a caricature of the player as a boxer and an opponent in a boxing ring.

In the Nintendo boxing game, some means must be used to identify a left punch and a right punch, as well as the differences between blows to the face and body jabs. Nintendo sells a controller which requires the player to press buttons or combinations of buttons to signify each such punch. When utilizing the present invention the location of each hand can be uniquely determined by having a :screen 46 divide two playing areas each having a transceiver 48. The location of each hand is separately registered by the appropriate transceiver.

When utilizing the present invention with this game, the control circuitry can be set to punch after a particular threshold of reflected signal is received. This signifies that the player's hand is at least as close as some predefined limit to the transceiver. In the event that the player's hand is further from the transceiver than is necessary to achieve the appropriate threshold, no punch is indicated on the game screen. When the player's hand approaches the transceiver sufficiently close that the threshold is crossed, the display screen will then indicate a punch.

The game might be played without a dividing screen should the transceiver be able to differentiate between the player's left and right hands. This might be achieved for example, by having transceivers which are directional. The infrared radiation may be focused with lenses for both transmitter and the receiver to collimate the signal. Each transceiver would only transmit and receive infrared radiation within a sufficiently narrow field of view. This would avoid the problem of having a left punch being misinterpreted as a right punch. The player must take care to avoid moving his or her left hand into the right punch field of view. Accordingly, the apparatus can differentiate between the player's two hands.

Figure 5A:
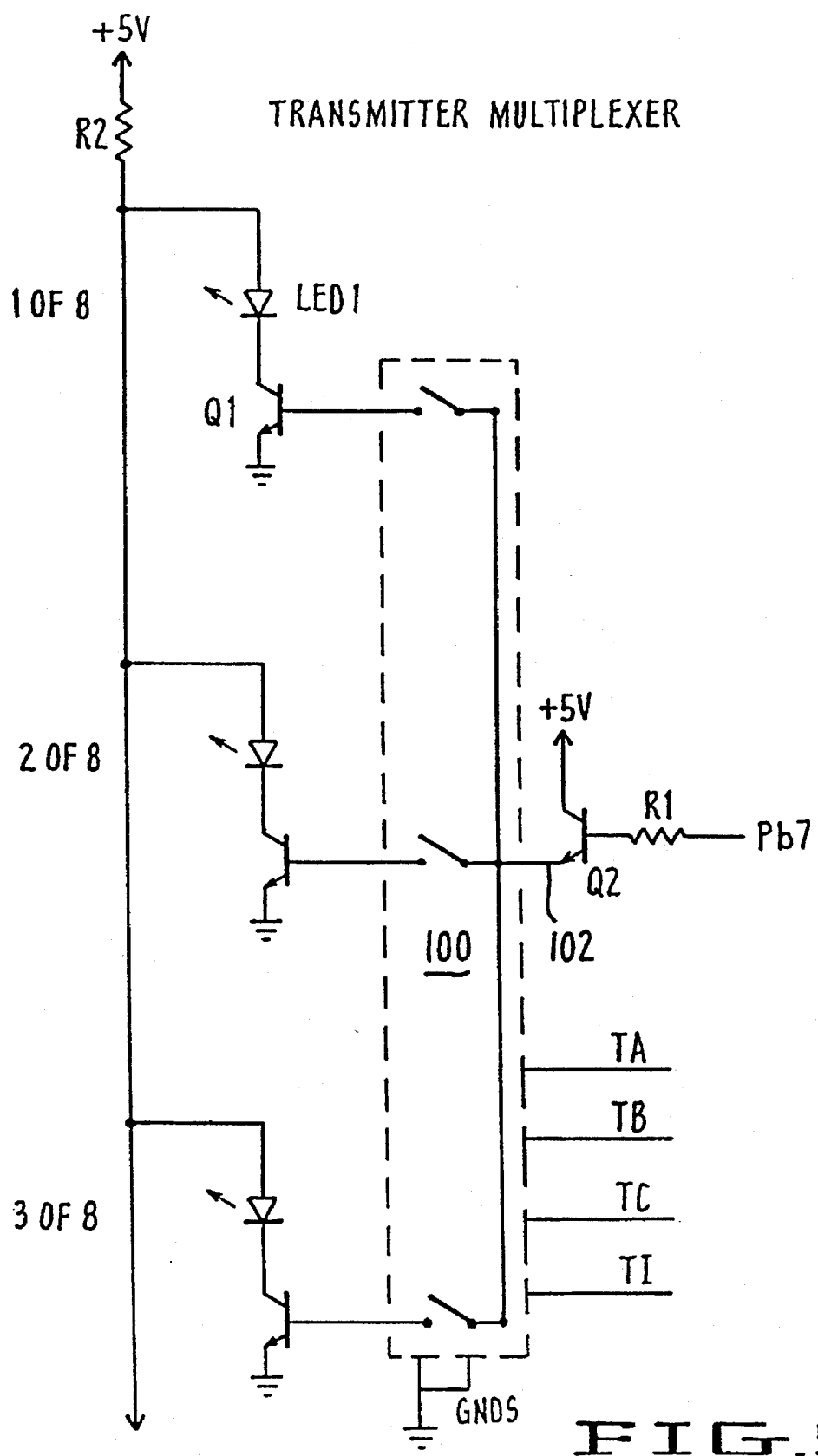
FIG. 5A is a schematic diagram of the transmitter of the preferred embodiment.

FIG. 5A shows a transmitter of the preferred embodiment. The transmitter contains a one of eight multiplexer 100 having three select control lines TA, TB, and TC and an inhibit line TI. The inhibit line disables the, multiplexer as necessary. The circuit for each of the eight outputs is preferably the same as each other output circuit; only three of these eight output circuits is shown to avoid unnecessarily complicating this circuit schematic diagram. The control lines are preferable controlled by the CPU shown in FIG. 5C.

The emitter of an input NPN transistor Q2 is coupled to an input port 102. The collector of transistor Q2 is coupled to a positive voltage V and the base of transistor Q2 to a current limiting bias resistor R1. The bias resistor is coupled to any convenient 1 KHz square wave source.

Each of the outputs of the multiplexer 100 is coupled to an appropriate output circuit. Each of the eight output circuits are the same as each other output circuit. The first output of the multiplexer is coupled to the base of an appropriate NPN transistor Q1. The emitter of the transistor Q1 is coupled to ground and the collector to the anode of a infrared light emitting diode LED1. All of the LEDs 1 through 8 are coupled to the positive voltage supply V through a second current limiting bias resistor R2.

The select channels A, B and C singly select one of the eight outputs of the multiplexer 100 to be active. The input transistor Q2 and the selected output transistor Q1 operate together as a Darlington pair to drive the selected light emitting diode LED1.

FIG. 5B shows the receiver circuit of the preferred embodiment. The infrared light received at the receiver strikes an appropriate one of the eight phototransistors Q3. The circuit for each of the eight inputs is preferably the same as each other input circuit; only two of these eight inputs circuits is shown to avoid unnecessarily complicating this circuit schematic diagram. Three control lines to the multiplexer circuit RA, RB and RC select the appropriate one of the eight the input circuits. The control lines are preferable controlled by the CPU shown in FIG. 5C. An inhibit line RI is also supplied to inactivate the receiver multiplexer if necessary.

The emitter of the phototransistor Q3 is coupled to a negative voltage supply $-V2$. The collector of the phototransistor Q3 is coupled to a positive voltage supply V1 through a current limiting bias resistor R3. The collector of the phototransistor Q3 is also coupled to one of the eight inputs of a one of eight multiplexer 104 through a high pass filter formed by a capacitor C1 and a resistor R4 to reduce the low frequency hum and decouple dc offset caused by variations in phototransistor gains. The resistor R4 is coupled between the input of the multiplexer and ground.

The output of the multiplexer 104 is coupled to a resistor R5 which sets the reference point for the gain stages. The resistor R5 is also coupled to ground. The output of the multiplexer is also coupled to a first terminal of capacitor C2. The second terminal of the capacitor C2 is coupled to the positive input of a first operational amplifier A1 and to a first terminal of a resistor R6. The second terminal of the resistor R6 is coupled to ground. The capacitor C2 and the resistor R6 operate as a high pass filter for the positive input of the operational amplifier A1.

The negative input of the operational amplifier A1 is coupled to ground through the series connection of a resistor R7 and a capacitor C3. The negative input of the operational A1 is also coupled to its output through a resistor R8. The output of the operational amplifier A1 is coupled to the positive input of the second operational amplifier A2.

The negative input of the second operational amplifier A2 is coupled to a resistor R9. The other terminal of the resistor R9 s coupled to the sliding terminal of a potentiometer R10. A first fixed terminal of the potentiometer R10 is coupled to ground and the second fixed terminal of the potentiometer is coupled to the negative supply voltage $-V2$. Accordingly, the appropriate potential can be applied to the negative input of the second operational amplifier A2 through the adjustable voltage divider network of the potentiometer.

The negative input of the second operational amplifier A2 is also coupled to its output through a resistor R11. The output of the second operational amplifier is coupled to an analog to digital converter through a resistor R12. The terminal of the resistor R12 which is not coupled to the second operational amplifier is coupled to the anode of a diode D1. The cathode of the diode D1 is coupled to the circuit ground.

Figure 5C:
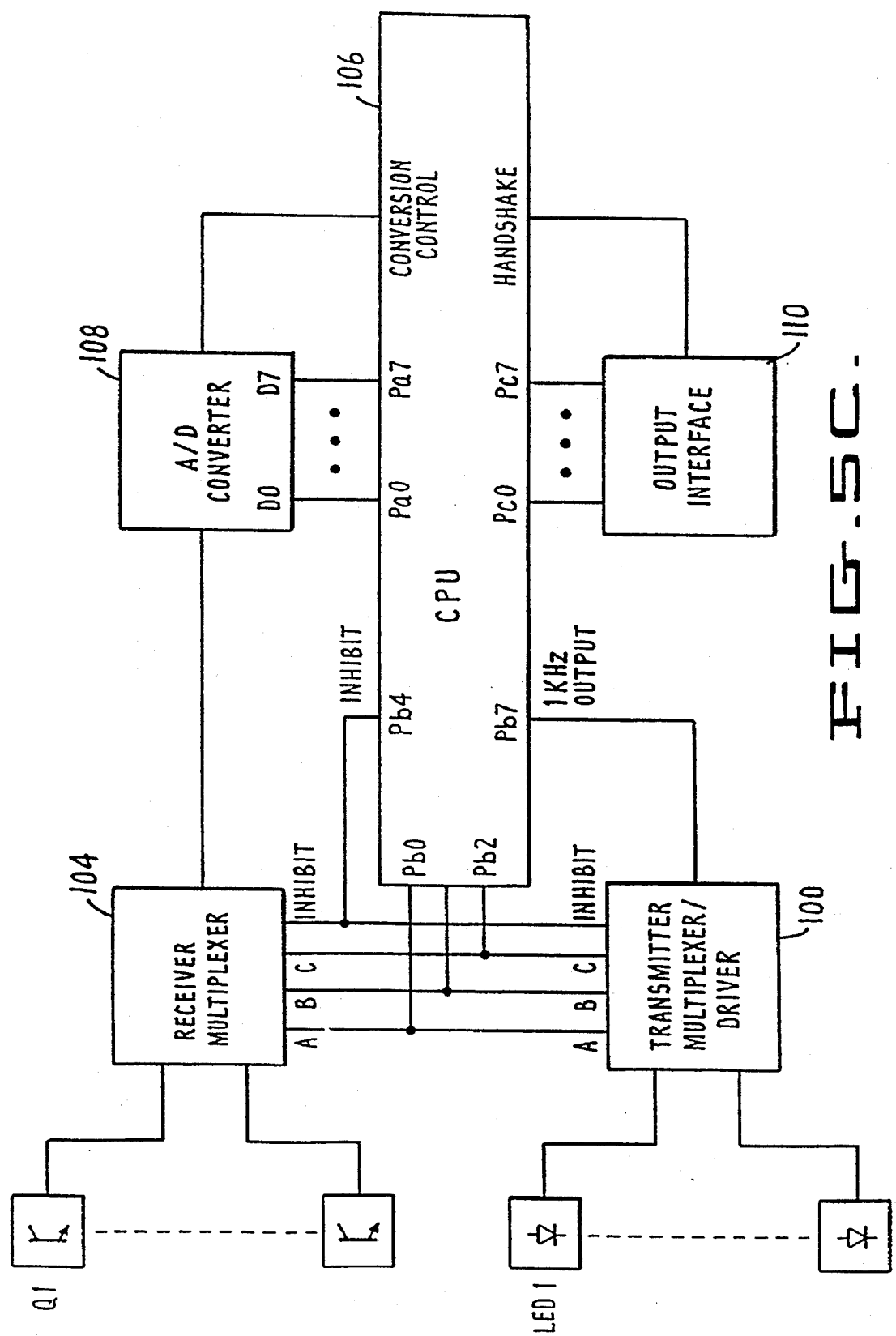
FIG. 5C is a block diagram of the preferred embodiment.

FIG. 5C shows a block diagram of the circuit of the preferred embodiment of the present invention. The transmitter and receiver sections are representational only and it should be understood that the transmitter and receiver are those shown in FIGS. 5A and 5B, respectively. Circuits having similar function and using different components can be designed and still fall within the spirit and scope of the present invention.

The channel select lines A, B and C and the inhibit line for the transmitter and receiver are coupled together and driven by a CPU 106. In the preferred embodiment the CPU is an Apple II. The CPU 106 can also be used to generate the 1 KHz square signal used to drive the selected infrared light emitting diode LED1. The output of the receiver op amp A2 is coupled to an analog to digital converter 108 (A/D converter). The A/D converter 108 forms an eight bit binary representation of the strength of the infrared received by the receiver circuit. That signal is supplied to the CPU 106 through pins Pa0 through Pa7. The CPU can control the A/D converter through the conversion control line as shown.

The CPU operates on these eight bits and supplies the appropriate information to the output interface 110 in order to control the display (not shown). The CPU 106 can control the output interface through the handshake line as shown.

The attached Appendix contains a copyrighted computer program. This computer program can be used by an Apple II to control the circuit of the preferred embodiment to interrace with a Nintendo video game system.

FIG. 6A shows a circuit schematic of the transmitter of an alternate embodiment of the present invention. A clocking circuit 50 operates to drive an infrared LED 52 which has its negative terminal grounded. The LED 52 is loaded by resistor 54. In the preferred embodiment the clock circuit 50 is an LM555 having eight input contact pins P1 through P8. The transmitter circuit also has a power supply Vcc and a circuit ground. Pin P8 and P4 are coupled to Vcc. Pin P1 is coupled to ground. Pin P7 is coupled to pins P8 and P6 through resistors 56 and 57, respectively. Pin P1 is coupled to pins P2 and P5 through capacitors 58 and 59, respectively. Pin P3 is coupled to the load resistor 54 which in turn is coupled to the positive terminal of the LED 52.

FIG. 6B shows a circuit schematic of the receiver of an alternate embodiment of the present invention. A reflected infrared signal R5 impinges on a phototransistor 60. The transistor is coupled to and biased by power supplies $V_{cc}$, coupled to the collector, and $V_{ee}$, coupled to the emitter. In certain circumstances it may be desirable to replace the phototransistor 60 with a photodiode. The phototransistor 60 may be loaded by a resistor 68.

The signal is ac coupled to the amplifier circuit 62 by the capacitor 70. The ac coupling can eliminate dc shift which can occur from ambient light such as sunlight or artificial room light. In this way only the signal resulting from the reflected signal will be amplified.

The signal developed by the phototransistor 60 is amplified in the amplifier circuit 62. The amplifier circuit includes a feedback resistor 72 and an operational amplifier 74 (op amp). The feedback resistor 72 may be a variable resistor.

The resistor 72 is coupled between the output and the negative input of the op amp 74. The coupling capacitor 70 is coupled between the collector of the phototransistor 60 and the negative input of the op amp 74.

The signal is then filtered in high pass filter 64 which eliminates power line noise, hum, and other interference. In the preferred embodiment, the filter includes two identical stages. The amplified signal from the amplifier circuit is applied to an filter input capacitor 76. A second filter capacitor 78 is coupled between the filter input capacitor 76 and the positive input of an op amp 80. A feedback resistor 82 is coupled between the output of the op amp 80 and the node coupling the filter input capacitor 76 and the second filter capacitor 78. A biasing resistor 84 is coupled between the positive input of the op amp 80 and ground. The negative input and the output of the op amp 80 are coupled together. A second similar filter may be used, as shown, to further remove unwanted line noise.

In some applications it may be desired to amplify the signal after filtering out the noise. The second amplifier circuit 66 has an input resistor 86 coupled to the negative input of the op amp 88. A feedback resistor 90 is coupled between the output and the negative of the op amp 88. The feedback resistor 90 may be variable to adjust the gain of the amplifier circuit 66. The positive input of the op amp 88 is coupled to ground.

The amplified signal is then applied to a comparator circuit 92 to determine the strength of the received signal. The output of the comparator 92 may be applied to a computer to be analyzed in controlling the cursor. An analog to digital circuit may be substituted for the comparator. Two or three of these circuits can be used to pinpoint a physical object in two or three dimensional space, respectively, for cursor control representing these dimensions.

In the alternative, the signal received by the phototransistor 60 can be directly applied to an analog to digital converter 94 as shown in FIG. 6C. The output of the analog to digital converter 94 is applied to a processor 96 which can digitally remove extraneous spurious signals and operate on the desired signal as necessary for the particular application. The processor 96 can be any commercially available processor such as a personal computer, video game or microprocessor chip.

The present invention has been described relative to specific embodiments. The system described herein clearly has a great deal of operational versatility. It can be used to effect not only a threshold (yes/no) type response (control signal), but also a gradient, analogue type response (control signal). Put another way, with the responded-to object producing reflected infrared above a certain level, or above different selected, specific levels, a related response is threshold "triggerable". In addition, responsive activity can "analogue-track" with the real-time, actual, reflected infrared level. Accordingly, response activity can range from a simple, single-mode characteristic to different, more complex, multiple-mode characteristics.

It will thus be clear to persons of ordinary skill in the art that the present invention may be utilized in a variety of applications. Modifications which become apparent to persons skilled in the art after reading this patent are deemed within the scope of the present invention.

```
                        29-AUG-88  20:41
             2   *Ultra Force prototype control routines
             3   *FILE: ULTRA
             4   *STAN AXELROD 17 July 1988
                 *********************
             6           ORG     $9000
                 *********************
             8
             9   * OUTPUT ASSIGNMENT
            10   * SWITCH,Y is a pointer to SENSE#'s
            11   ***********************************
            12   *    SWITCH  bit                   *
            13   * 7   6   5   4   3   2   1   0   *
            14   * *   *I secondary I I primary    *
            15   *      I sensor    I I sensor     *
            16   *                                  *
            17   ***********************************
            18   * bit7 set for primary OR secondary
            19   * bit6 set for primary AND secondary
            20   * bit6&7 set for primary NOT secondary
            21
            22   *INPUT ASSIGNMENT
            23   *PARAM,Y selects active areas & definitions
            24   *         and tracks with SWITCH,Y
            25   ***********************************
            26   *    PARAM  bit                    *
            27   * 7   6   5   4   3   2   1   0   *
            28   *   area          I I area        *
            29   *   select        I I definition* 
            30   *                                  *
            31   ***********************************
            32
            33   *Configuration registers
            34
=0090       35   SWITCH    =       $90         ;switch register bytes
            36                                 ;and output port bits
=0090       37   UP        =       SWITCH
=0091       38   LEFT      =       SWITCH+1
=0092       39   DOWN      =       SWITCH+2
=0093       40   RIGHT     =       SWITCH+3
=0094       41   SELECT    =       SWITCH+4
=0095       42   START     =       SWITCH+5
=0096       43   BBUT      =       SWITCH+6
=0097       44   ABUT      =       SWITCH+7
            45
            46   *illegal output combinations
=0005       47   ILLEGL1   =       %00000101   ;up&down
=000A       48   ILLEGL2   =       %00001010   ;left&right
            49
=0098       50   PARAM     =       $98
            51
=0098       52   UPPARA    =       PARAM       ;output parameter bytes
=0099       53   LPARA     =       PARAM+1
=009A       54   DNPARA    =       PARAM+2
=009B       55   RTPARA    =       PARAM+3
=009C       56   SEPARA    =       PARAM+4
=009D       57   STPARA    =       PARAM+5
=009E       58   BPARA     =       PARAM+6
```

```
         60
=0000    61  SENSOR    =   $0
         62
=0000    63  SENSE0    =   SENSOR
=0001    64  SENSE1    =   SENSOR+1
=0002    65  SENSE2    =   SENSOR+2
=0003    66  SENSE3    =   SENSOR+3
=0004    67  SENSE4    =   SENSOR+4
=0005    68  SENSE5    =   SENSOR+5
=0006    69  SENSE6    =   SENSOR+6
=0007    70  SENSE7    =   SENSOR+7
         71
         72  *configuration values
         73
         74  *AREA SELECT
=0080    75  TURBO     =   %10000000    ;turbo mode
=0000    76  NOTTRB    =   %00000000    ;not turbo mode
         77
=0070    78  AR123     =   %01110000    ;all 3 areas
=0060    79  AR23      =   %01100000
=0050    80  AR13      =   %01010000
=0030    81  AR12      =   %00110000
=0040    82  AR3       =   %01000000
=0020    83  AR2       =   %00100000
=0010    84  AR1       =   %00010000
         85
=0040    86  AND       =   %01000000
=0080    87  OR        =   %10000000
=00C0    88  NOT       =   %11000000
         89
         90  *AREA DEFINITION
=0000    91  POS       =   %00000000    ;position
=0001    92  THRESH    =   %00000001    ;threshold
=0002    93  POSVEL    =   %00000010    ;positive velocity threshold
=0003    94  NEGVEL    =   %00000011    ;negative velocity threshold
=0004    95  DIAG      =   %00000100    ;sensor is at diagonal of outputs
=0000    96  VELPL     =   $0           ;velocity thresholds
=0000    97  VELMN     =   $0
             *******************
         99
         100 *ZERO PAGE EQUATES
         101 *thresholds
=0060    102 THRHLD    =   $60
=0060    103 THRESH0   =   THRHLD       ;to be used as a buffer
=0061    104 THRESH1   =   THRHLD+1
=0062    105 THRESH2   =   THRHLD+2
=0063    106 THRESH3   =   THRHLD+3     ;threshold level presets
         107
=0064    108 ANDOR     =   THRHLD+4     ;b7=OR , b6=AND
=0065    109 SHRTME    =   THRHLD+5
=0066    110 OLD       =   THRHLD+6     ;output created in here
         111
=0068    112 OLDBIT    =   $68          ;last flags used
=0068    113 OLDBIT0   =   OLDBIT
=0069    114 OLDBIT1   =   OLDBIT+1
=006A    115 OLDBIT2   =   OLDBIT+2
```

```
            =006B    116  OLDBIT3   =    OLDBIT+3
            =006C    117  OLDBIT4   =    OLDBIT+4
            =006D    118  OLDBIT5   =    OLDBIT+5
            =006E    119  OLDBIT6   =    OLDBIT+6
            =006F    120  OLDBIT7   =    OLDBIT+7
                     121
                     122  *6522 equates
            =C200    123  PORTB     =    $C200           ;slot2
            =C201    124  PORTA     =    PORTB+1
            =C202    125  DDRB      =    PORTB+2
            =C203    126  DDRA      =    PORTB+3
            =C204    127  T1L       =    PORTB+4
            =C205    128  T1H       =    PORTB+5
            =C208    129  T2L       =    PORTB+8
            =C209    130  T2H       =    PORTB+9
            =C20B    131  ACR       =    PORTB+$B
            =C20C    132  PCR       =    PORTB+$C
            =C20D    133  IFR       =    PORTB+$D
            =C20E    134  IER       =    PORTB+$E
                     135
                     136  *A/D equates
            =C0F0    137  ADIN      =    $C0F0
            =C0F1    138  ADSTAT    =    ADIN+1          ;slot7
            =0300    139  SIGNAL    =    $300
                     140
                     141  *Apple equates
            =C000    142  KEYIN     =    $C000
            =C010    143  KEYSTRB   =    $C010           ;keyboard reads for exit
            =FDDA    144  COUT      =    $FDDA           ;output data
            =FD8E    145  CROUT     =    $FD8E           ;<cr>
            =F941    146  PRNTAX    =    $F941
                     148  ********************
                     149  *INITIALIZATION
                     ********************
009000: 48           151           PHA                   ;make debugger happy
009001: D8           152           CLD
009002: 78           153           SEI
009003: A9 C0        154           LDA   #%11000000
009005: 8D 0B C2     155           STA   ACR
009008: A9 E2        156           LDA   #%11100010      ;T2 set for oneshot
00900A: 8D 0E C2     157           STA   IER             ;CA1 gets nintendo load signal
00900D: 8D 0D C2     158           STA   IFR
009010: A9 01        159           LDA   #%00000001      ;CA1 positive active edge
009012: 8D 0C C2     160           STA   PCR
009015: A9 FF        161           LDA   #$FF
009017: 8D 02 C2     162           STA   DDRB            ;Pb all outputs
00901A: 8D 03 C2     163           STA   DDRA            ;Pa ditto
00901D: 8D 01 C2     164           STA   PORTA           ;init with all outputs OFF
009020: A9 00        165           LDA   #TIMELO
009022: 8D 04 C2     166           STA   T1L
009025: A9 00        167           LDA   #0
009027: A2 00        168           LDX   #0
009029: A0 08        169           LDY   #8
00902B: 95 68        170  OLDCLR   STA   OLDBIT,X
00902D: E8           171           INX
```

```
00902E: 88              172             DEY
00902F: D0 FA =902B     173             BNE     OLDCLR
009031: A9 01           174             LDA     #$01
009033: 85 65           175             STA     SHRTME          ;variable for ONESHT
                                ********************
                                ********************
                        178
009035: 20 1D 92        179     LOOP    JSR     HNDSHK          ;wait for nintendo to start
009038: 20 4F 90        180             JSR     GETDAT          ;get data
00903B: 20 A0 90        181             JSR     DATOUT          ;output data
00903E: 20 00 92        182             JSR     ILLEGAL         ;ignore illegal combinations
009041: 20 28 92        183             JSR     EXIT?           ;leave w/carry set if keypress
009044: 90 EF =9035     184             BCC     LOOP
009046: 4C 33 92        185             JMP     MERLIN
                                ********************
                        187     *1KHz generation using a 6522 Pb7 in slot4
                        188     *This signal will always be running
                        189
            =0000       190     TIMELO  =       $00
            =0002       191     TIMEHI  =       $02             ;values for 1KHz @ 1MHz clock
                        192
                                ********************
                        194
009049: A6 65           195     ONESHT  LDX     SHRTME
00904B: CA              196     LOOP1   DEX
00904C: D0 FD =904B     197             BNE     LOOP1
00904E: 60              198             RTS
                                ********************
                        200
00904F: A9 02           201     GETDAT  LDA     #TIMEHI
009051: 8D 05 C2        202             STA     T1H             ;start 1KHz clock
009054: A0 07           203             LDY     #7              ;channel select routine
009056: 8C 00 C2        204     NXTDAT  STY     PORTB           ;channel # passed thru Y
009059: 20 6B 90        205             JSR     UPDATA          ;get next channel's data
00905C: 88              206             DEY
00905D: D0 F7 =9056     207             BNE     NXTDAT
00905F: 8C 00 C2        208             STY     PORTB
009062: 20 6B 90        209             JSR     UPDATA          ;the last one
009065: A9 10           210     DATRTS  LDA     #%00010000
009067: 8D 00 C2        211             STA     PORTB           ;shut off multiplexers
00906A: 60              212             RTS
                                ********************
                        214
00906B: 2C 0D C2        215     UPDATA  BIT     IFR             ;square wave timeout?
00906E: 10 FB =906B     216             BPL     UPDATA          ;nope
009070: 2C 00 C2        217     CHANGE  BIT     PORTB
009073: 10 FB =9070     218             BPL     CHANGE          ;start on hi
009075: 20 BF 90        219     HISAMP  JSR     CONVERT
009078: 99 00 03        220             STA     SIGNAL,Y
00907B: 2C 00 C2        221     HIWAIT  BIT     PORTB
00907E: 30 FB =907B     222             BMI     HIWAIT
009080: 20 BF 90        223     LOSAMP  JSR     CONVERT
009083: 18              224             CLC
009084: F9 00 03        225             SBC     SIGNAL,Y
009087: B0 02 =908B     226             BCS     SIGSTO
```

```
009089: A9 00         227              LDA   #0
00908B: 99 00 03      228  SIGSTO  STA   SIGNAL,Y
00908E: 60            229  HLRTS   RTS
                      230
                      231  CONVERT
00908F: 20 49 90      232          JSR   ONESHT
009092: 8D F0 C0      233          STA   ADIN      ;start conversion
009095: AD F1 C0      234  CONWAIT LDA   ADSTAT
009098: 29 01         235          AND   #$01
00909A: F0 F9 =9095   236          BEQ   CONWAIT
00909C: AD F0 C0      237          LDA   ADIN
00909F: 60            238          RTS
                           ********************
                           ********************
                      241
                      242  *massage data and output it
0090A0: A0 FF         243  DATOUT  LDY   #$FF      ;reset output
0090A2: 8C 01 C2      244          STY   PORTA
0090A5: A9 FE         245          LDA   #%11111110
0090A7: 85 66         246          STA   OLD
0090A9: A0 00         247          LDY   #$0       ;init to UP switch
0090AB: 20 BA 90      248  NXTSWCH JSR   SENSGET   ;hit returns carry set
0090AE: 20 CF 90      249          JSR   DIAG?
0090B1: C8            250          INY             ;do next bit
0090B2: C0 08         251          CPY   #8
0090B4: D0 F5 =90AB   252          BNE   NXTSWCH
0090B6: 20 3B 91      253          JSR   FIXBIT    ;set output bits
0090B9: 60            254  OUTRTS  RTS             ;all done
                           ********************
                      256
0090BA: B9 90 00      257  SENSGET LDA   SWITCH,Y  ;output switch
0090BD: 48            258          PHA
0090BE: 29 C0         259          AND   #%11000000 ;mask for and/or
0090C0: C9 C0         260          CMP   #%11000000
0090C2: F0 35 =90F9   261          BEQ   JSTONE    ;primary NOT secondary
0090C4: 2A            262          ROL
0090C5: B0 46 =910D   263          BCS   PORS      ;primary OR secondary
0090C7: 2A            264          ROL
0090C8: B0 53 =911D   265          BCS   PANDS     ;primary AND secondary
0090CA: 68            266          PLA             ;no secondary sensor
0090CB: 20 2D 91      267          JSR   PARGET    get data (hit sets carry)
0090CE: 60            268          RTS
                      269
0090CF: B9 98 00      270  DIAG?   LDA   PARAM,Y
0090D2: 29 07         271          AND   #%00000111
0090D4: C9 05         272          CMP   #DIAG+THRESH
0090D6: F0 01 =90D9   273          BEQ   DIAGNL
0090D8: 60            274  NODIAG  RTS
0090D9: B9 90 00      275  DIAGNL  LDA   SWITCH,Y  ;see if we force a diagonal
0090DC: 29 07         276          AND   #%00000111 ;get primary
0090DE: AA            277          TAX
0090DF: BD 00 03      278          LDA   SIGNAL,X
0090E2: C5 63         279          CMP   THRESH3
0090E4: B0 10 =90F6   280          BCS   YESDIA
0090E6: B9 90 00      281          LDA   SWITCH,Y
0090E9: 29 38         282          AND   #%00111000
0090EB: 6A            283          ROR
```

```
0090EC: 6A              284           ROR
0090ED: 6A              285           ROR
0090EE: AA              286           TAX
0090EF: BD 00 03        287           LDA    SIGNAL,X
0090F2: C5 63           288           CMP    THRESH3
0090F4: 90 E2 =90D8     289           BCC    NODIAG
0090F6: 4C F0 91        290   YESDIA  JMP    YESRTS
                        291
0090F9: 68              292   JSTONE  PLA
0090FA: 20 2D 91        293           JSR    PARGET
0090FD: 90 2D =912C     294           BCC    SENRTS      ;no primary
0090FF: B9 90 00        295           LDA    SWITCH,Y
009102: 6A              296           ROR
009103: 6A              297           ROR
009104: 6A              298           ROR
009105: 20 2D 91        299           JSR    PARGET      ;return w/NOT secondary
009108: 6A              300           ROR                ;get result
009109: 49 80           301           EOR    #%10000000  ;invert carry flag
00910B: 2A              302           ROL
00910C: 60              303           RTS
                        304
00910D: 68              305   PORS    PLA
00910E: 20 2D 91        306           JSR    PARGET
009111: B0 19 =912C     307           BCS    SENRTS
009113: B9 90 00        308           LDA    SWITCH,Y
009116: 6A              309           ROR                ;no primary, check secondary
009117: 6A              310           ROR
009118: 6A              311           ROR
009119: 20 2D 91        312           JSR    PARGET
00911C: 60              313           RTS                ;return with secondary flag
                        314
00911D: 68              315   PANDS   PLA
00911E: 20 2D 91        316           JSR    PARGET
009121: 90 09 =912C     317           BCC    SENRTS      ;no primary, return w/carry 0
009123: B9 90 00        318           LDA    SWITCH,Y
009126: 6A              319           ROR
009127: 6A              320           ROR
009128: 6A              321           ROR
009129: 20 2D 91        322           JSR    PARGET      ;secondary determines AND
00912C: 60              323   SENRTS  RTS
                        324
00912D: 29 07           325   PARGET  AND    #%00000111  ;mask for sensor
00912F: AA              326           TAX                ;X holds pointer to xcvr
009130: BD 00 03        327   OUT?    LDA    SIGNAL,X
009133: C5 60           328           CMP    THRESH0     is it less than buffer?
009135: 90 1E =9155     329           BCC    ITSOUT
009137: 20 5A 91        330           JSR    WHAT        ;determine type of action
00913A: 60              331           RTS
                              ********************
                        333
00913B: A2 08           334   FIXBIT  LDX    #8
00913D: A0 00           335           LDY    #0
00913F: B9 68 00        336   FIXLP   LDA    OLDBIT,Y
009142: 2A              337           ROL                ;reinstall carry info
009143: 90 08 =914D     338           BCC    FIXNXT
009145: A5 66           339           LDA    OLD
```

```
009147: 2D 01 C2      340              AND     PORTA
00914A: 8D 01 C2      341              STA     PORTA
00914D: 38            342   FIXNXT     SEC
00914E: 26 66         343              ROL     OLD
009150: C8            344              INY
009151: CA            345              DEX
009152: D0 EB =913F   346              BNE     FIXLP
009154: 60            347              RTS
                      348   ********************
                      349
009155: B9 68 00      350   ITSOUT     LDA     OLDBIT,Y     ;get last active flag
009158: 2A            351              ROL                  ;put it in carry
009159: 60            352              RTS
                      353
00915A: B9 98 00      354   WHAT       LDA     PARAM,Y      ;get active areas & type
00915D: 29 07         355              AND     #%00000111   ;mask for area definition
00915F: C9 00         356              CMP     #POS
009161: F0 0C =916F   357              BEQ     POSIT        ;0 means position
009163: C9 01         358              CMP     #THRESH
009165: F0 0C =9173   359              BEQ     THR          ;1 means threshold
009167: C9 02         360              CMP     #POSVEL
009169: F0 0C =9177   361              BEQ     VELPLS       ;2 means positve velocity
00916B: C9 03         362              CMP     #NEGVEL
00916D: F0 0C =917B   363              BEQ     VELMIN       ;3 means minus velocity
                      364
                      365   *leave routines with carry set if a hit
00916F: 20 7F 91      366   POSIT      JSR     INRNGE
009172: 60            367              RTS
                      368   *THR BRK
009173: 20 7F 91      369   THR        JSR     INRNGE
009176: 60            370   THRRTS     RTS                  ;carry flag is all we need
                      371
009177: 20 7F 91      372   VELPLS     JSR     INRNGE
00917A: 60            373              RTS
                      374
00917B: 20 7F 91      375   VELMIN     JSR     INRNGE
00917E: 60            376              RTS
                      377
                      378   *active area determination (TRUE returns SEC)
00917F: B9 98 00      379   INRNGE     LDA     PARAM,Y
                      380
009182: 29 70         381              AND     #%01110000   ;mask for area select
009184: C9 70         382              CMP     #AR123
009186: F0 1A =91A2   383              BEQ     FLG123
009188: C9 60         384              CMP     #AR23
00918A: F0 1F =91AB   385              BEQ     FLG23
00918C: C9 50         386              CMP     #AR13
00918E: F0 24 =91B4   387              BEQ     FLG13
009190: C9 30         388              CMP     #AR12
009192: F0 4F =91E3   389              BEQ     FLG12
009194: C9 40         390              CMP     #AR3
009196: F0 28 =91C0   391              BEQ     FLG3
009198: C9 20         392              CMP     #AR2
00919A: F0 3A =91D6   393              BEQ     FLG2
00919C: C9 10         394              CMP     #AR1
00919E: F0 29 =91C9   395              BEQ     FLG1
0091A0: 18            396              CLC
```

```
0091A1: 60              397           RTS                    ;it's a 0 (not selected)
                        398
0091A2: BD 00 03        399  FLG123   LDA      SIGNAL,X
0091A5: C5 61           400           CMP      THRESH1
0091A7: B0 47 =91F0     401           BCS      YESRTS         ;within range
0091A9: 90 4A =91F5     402           BCC      NORTS
                        403
0091AB: BD 00 03        404  FLG23    LDA      SIGNAL,X
0091AE: C5 62           405           CMP      THRESH2
0091B0: B0 3E =91F0     406           BCS      YESRTS         ;within range
0091B2: 90 41 =91F5     407           BCC      NORTS
                        408
0091B4: 20 C9 91        409  FLG13    JSR      FLG1
0091B7: B0 37 =91F0     410           BCS      YESRTS
0091B9: 20 C0 91        411           JSR      FLG3
0091BC: B0 32 =91F0     412           BCS      YESRTS
0091BE: 90 35 =91F5     413           BCC      NORTS
                        414
0091C0: BD 00 03        415  FLG3     LDA      SIGNAL,X
0091C3: C5 63           416           CMP      THRESH3
0091C5: B0 29 =91F0     417           BCS      YESRTS         ;within range
0091C7: 90 2C =91F5     418           BCC      NORTS
                        419
0091C9: BD 00 03        420  FLG1     LDA      SIGNAL,X
0091CC: C5 61           421           CMP      THRESH1
0091CE: 90 25 =91F5     422           BCC      NORTS          ;out of range
0091D0: C5 62           423           CMP      THRESH2
0091D2: B0 21 =91F5     424           BCS      NORTS
0091D4: 90 1A =91F0     425           BCC      YESRTS
                        426
0091D6: BD 00 03        427  FLG2     LDA      SIGNAL,X
0091D9: C5 62           428           CMP      THRESH2
0091DB: 90 18 =91F5     429           BCC      NORTS          ;out of range
0091DD: C5 63           430           CMP      THRESH3
0091DF: B0 14 =91F5     431           BCS      NORTS
0091E1: 90 0D =91F0     432           BCC      YESRTS
                        433
0091E3: BD 00 03        434  FLG12    LDA      SIGNAL,X
0091E6: C5 61           435           CMP      THRESH1
0091E8: 90 0B =91F5     436           BCC      NORTS          ;out of range
0091EA: C5 63           437           CMP      THRESH3
0091EC: B0 07 =91F5     438           BCS      NORTS
0091EE: 90 00 =91F0     439           BCC      YESRTS
                        440
0091F0: 38              441  YESRTS   SEC
0091F1: 20 FA 91        442           JSR      OLDSET
0091F4: 60              443           RTS
0091F5: 18              444  NORTS    CLC
0091F6: 20 FA 91        445           JSR      OLDSET
0091F9: 60              446           RTS
                        447
0091FA: 6A              448  OLDSET   ROR                     ;move carry to b7
0091FB: 99 68 00        449           STA      OLDBIT,Y
0091FE: 2A              450           ROL                     ;put it back
0091FF: 60              451           RTS
                             *******************
                        453
```

```
009200: AD 01 C2    454  ILLEGAL LDA  PORTA
009203: 48          455          PHA
009204: 29 05       456          AND  #ILLEGL1   ;mask for illegal combo 1
009206: D0 07 =920F 457          BNE  NXTILL     ;it's ok
009208: 68          458          PLA
009209: 49 05       459          EOR  #ILLEGL1
00920B: 8D 01 C2    460          STA  PORTA      ;so correct it
00920E: 48          461          PHA
00920F: 68          462  NXTILL  PLA
009210: 29 0A       463          AND  #ILLEGL2
009212: D0 08 =921C 464          BNE  ILLRTS
009214: AD 01 C2    465          LDA  PORTA
009217: 49 0A       466          EOR  #ILLEGL2
009219: 8D 01 C2    467          STA  PORTA
00921C: 60          468  ILLRTS  RTS
                         ********************
                    470
00921D: AD 0D C2    471  HNDSHK  LDA  IFR
009220: 29 02       472          AND  #%00000010
009222: F0 F9 =921D 473          BEQ  HNDSHK
009224: 8D 0D C2    474          STA  IFR        ;clear CA1 IRQ
009227: 60          475          RTS
                         ********************
                    477
009228: 18          478  EXIT?   CLC
009229: 2C 00 C0    479          BIT  KEYIN
00922C: 50 01 =922F 480          BVC  EXRET      ;no keypress
00922E: 38          481          SEC
00922F: AD 10 C0    482  EXRET   LDA  KEYSTRB    ;clear keyboard strobe
009232: 60          483          RTS
                    484
                         ********************
                    486
                    487  MERLIN
009233: 4C F8 03    488          JMP  $3F8       ;go back to assembler
                         ********************
```

End Merlin-16 assembly, 566 bytes, errors: 0 , symbol table: $1800-$1DD7

Symbol table, alphabetical order:

| | | | | | | | | |
|---|---|---|---|---|---|---|---|---|
| ? | ABUT | =$97 | | ACR | =$C20B | | ADIN | =$C0F0 | ADSTAT | =$C0F1 |
| ? | AND | =$40 | ? | ANDOR | =$64 | ? | APARA | =$9F | AR1 | =$10 |
| | AR12 | =$30 | | AR123 | =$70 | | AR13 | =$50 | AR2 | =$20 |
| | AR23 | =$60 | | AR3 | =$40 | ? | BBUT | =$96 | ? | BPARA | =$9E |
| | CHANGE | =$9070 | | CONVERT | =$908F | | CONWAIT | =$9095 | ? | COUT | =$FDDA |
| ? | CROUT | =$FD8E | | DATOUT | =$90A0 | ? | DATRTS | =$9065 | DDRA | =$C203 |
| | DDRB | =$C202 | | DIAG | =$04 | | DIAG? | =$90CF | DIAGNL | =$90D9 |
| ? | DNPARA | =$9A | ? | DOWN | =$92 | | EXIT? | =$9228 | EXRET | =$922F |
| | FIXBIT | =$913B | | FIXLP | =$913F | | FIXNXT | =$914D | FLG1 | =$91C9 |
| | FLG12 | =$91E3 | | FLG123 | =$91A2 | | FLG13 | =$91B4 | FLG2 | =$91D6 |
| | FLG23 | =$91AB | | FLG3 | =$91C0 | | GETDAT | =$904F | ? | HISAMP | =$9075 |
| | HIWAIT | =$907B | ? | HLRTS | =$908E | | HNDSHK | =$921D | IER | =$C20E |
| | IFR | =$C20D | | ILLEGAL | =$9200 | | ILLEGL1 | =$05 | ILLEGL2 | =$0A |
| | ILLRTS | =$921C | | INRNGE | =$917F | | ITSOUT | =$9155 | JSTONE | =$90F9 |
| | KEYIN | =$C000 | | KEYSTRB | =$C010 | ? | LEFT | =$91 | LOOP | =$9035 |

```
    LOOP1    =$904B   ?  LOSAMP   =$9080   ?  LPARA    =$99        MERLIN   =$9233
    NEGVEL   =$03        NODIAG   =$90D8      NORTS    =$91F5   ?  NOT      =$C0
?   NOTTRB   =$00        NXTDAT   =$9056      NXTILL   =$920F       NXTSWCH  =$90AB
    OLD      =$66        OLDBIT   =$68     ?  OLDBIT0  =$68     ?  OLDBIT1  =$69
?   OLDBIT2  =$6A     ?  OLDBIT3  =$6B     ?  OLDBIT4  =$6C     ?  OLDBIT5  =$6D
?   OLDBIT6  =$6E     ?  OLDBIT7  =$6F        OLDCLR   =$902B      OLDSET   =$91FA
    ONESHT   =$9049   ?  OR       =$80     ?  OUT?     =$9130   ?  OUTRTS   =$90B9
    PANDS    =$911D      PARAM    =$98        PARGET   =$912D      PCR      =$C20C
    PORS     =$910D      PORTA    =$C201      PORTB    =$C200      POS      =$00
    POSIT    =$916F      POSVEL   =$02     ?  PRNTAX   =$F941   ?  RIGHT    =$93
?   RTPARA   =$9B     ?  SELECT   =$94        SENRTS   =$912C   ?  SENSE0   =$00
?   SENSE1   =$01     ?  SENSE2   =$02     ?  SENSE3   =$03     ?  SENSE4   =$04
?   SENSE5   =$05     ?  SENSE6   =$06     ?  SENSE7   =$07        SENSGET  =$90BA
    SENSOR   =$00     ?  SEPARA   =$9C        SHRTME   =$65        SIGNAL   =$0300
    SIGSTO   =$908B   ?  START    =$95     ?  STPARA   =$9D        SWITCH   =$90
    T1H      =$C205      T1L      =$C204   ?  T2H      =$C209   ?  T2L      =$C208
    THR      =$9173      THRESH   =$01        THRESH0  =$60        THRESH1  =$61
    THRESH2  =$62        THRESH3  =$63        THRHLD   =$60     ?  THRRTS   =$9176
    TIMEHI   =$02        TIMELO   =$00     ?  TURBO    =$80     ?  UP       =$90
    UPDATA   =$906B   ?  UPPARA   =$98        VELMIN   =$917B   ?  VELMN    =$00
?   VELPL    =$00        VELPLS   =$9177      WHAT     =$915A      YESDIA   =$90F6
    YESRTS   =$91F0

Symbol table, numerical order:

SENSOR   =$00     ?  SENSE0   =$00     ?  NOTTRB   =$00        POS      =$00
?   VELPL    =$00        VELMN    =$00        TIMELO   =$00     ?  SENSE1   =$01
    THRESH   =$01     ?  SENSE2   =$02        POSVEL   =$02        TIMEHI   =$02
?   SENSE3   =$03        NEGVEL   =$03     ?  SENSE4   =$04        DIAG     =$04
    ILLEGL1  =$05     ?  SENSE5   =$05     ?  SENSE6   =$06     ?  SENSE7   =$07
    ILLEGL2  =$0A        AR1      =$10        AR2      =$20        AR12     =$30
    AR3      =$40     ?  AND      =$40        AR13     =$50        AR23     =$60
    THRHLD   =$60        THRESH0  =$60        THRESH1  =$61        THRESH2  =$62
    THRESH3  =$63     ?  ANDOR    =$64        SHRTME   =$65        OLD      =$66
    OLDBIT   =$68     ?  OLDBIT0  =$68     ?  OLDBIT1  =$69     ?  OLDBIT2  =$6A
?   OLDBIT3  =$6B     ?  OLDBIT4  =$6C     ?  OLDBIT5  =$6D     ?  OLDBIT6  =$6E
?   OLDBIT7  =$6F        AR123    =$70     ?  TURBO    =$80     ?  OR       =$80
    SWITCH   =$90     ?  UP       =$90     ?  LEFT     =$91     ?  DOWN     =$92
?   RIGHT    =$93     ?  SELECT   =$94     ?  START    =$95     ?  BBUT     =$96
?   ABUT     =$97        PARAM    =$98     ?  UPPARA   =$98     ?  LPARA    =$99
?   DNPARA   =$9A     ?  RTPARA   =$9B     ?  SEPARA   =$9C     ?  STPARA   =$9D
?   BPARA    =$9E     ?  APARA    =$9F        NOT      =$C0        SIGNAL   =$0300
    OLDCLR   =$902B      LOOP     =$9035      ONESHT   =$9049      LOOP1    =$904B
    GETDAT   =$904F      NXTDAT   =$9056   ?  DATRTS   =$9065      UPDATA   =$906B
    CHANGE   =$9070   ?  HISAMP   =$9075      HIWAIT   =$907B   ?  LOSAMP   =$9080
    SIGSTO   =$908B   ?  HLRTS    =$908E      CONVERT  =$908F      CONWAIT  =$9095
    DATOUT   =$90A0      NXTSWCH  =$90AB   ?  OUTRTS   =$90B9      SENSGET  =$90BA
    DIAG?    =$90CF      NODIAG   =$90D8      DIAGNL   =$90D9      YESDIA   =$90F6
    JSTONE   =$90F9      PORS     =$910D      PANDS    =$911D      SENRTS   =$912C
    PARGET   =$912D   ?  OUT?     =$9130      FIXBIT   =$913B      FIXLP    =$913F
    FIXNXT   =$914D      ITSOUT   =$9155      WHAT     =$915A      POSIT    =$916F
    THR      =$9173   ?  THRRTS   =$9176      VELPLS   =$9177      VELMIN   =$917B
    INRNGE   =$917F      FLG123   =$91A2      FLG23    =$91AB      FLG13    =$91B4
    FLG3     =$91C0      FLG1     =$91C9      FLG2     =$91D6      FLG12    =$91E3
    YESRTS   =$91F0      NORTS    =$91F5      OLDSET   =$91FA      ILLEGAL  =$9200
    NXTILL   =$920F      ILLRTS   =$921C      HNDSHK   =$921D      EXIT?    =$9228
    EXRET    =$922F      MERLIN   =$9233      KEYIN    =$C000      KEYSTRB  =$C010
```

```
  ADIN    =$C0F0     ADSTAT  =$C0F1     PORTB   =$C200     PORTA   =$C201
  DDRB    =$C202     DDRA    =$C203     T1L     =$C204     T1H     =$C205
? T2L     =$C20B   ? T2H     =$C209     ACR     =$C20B     PCR     =$C20C
  IFR     =$C20D     IER     =$C20E   ? PRNTAX  =$F941   ? CROUT   =$FD8E
? COUT    =$FDDA
```

```
                        29-AUG-88  20:38
            2    *Ultra Force prototype configuration routines
            3    *FILE: TOPGUN
            4    *STAN AXELROD 17 July 1988
                 *********************
            6              ORG    $8000
                 *********************
            8
            9    * OUTPUT ASSIGNMENT
           10    * SWITCH,Y is a pointer to AREA SELECT
           11    **********************************
           12    *    SWITCH  bit                  *
           13    * 7   6   5   4   3   2   1   0 *
           14    * *     *| secondary || primary   *
           15    *         |  sensor   ||  sensor  *
           16    *                                 *
           17    **********************************
           18    * bit7 set for primary OR secondary
           19    * bit6 set for primary AND secondary
           20
           21    *INPUT ASSIGNMENT
           22    *PARAM,Y selects sensor, active areas & definitions
           23    **********************************
           24    *      PARAM  bit                 *
           25    * 7   6   5   4   3   2   1   0 *
           26    *    area         |  | area       *
           27    *   select        |  | definition*
           28    *                                 *
           29    **********************************
           30
           31    *Configuration registers
           32
=0090      33    SWITCH   =    $90        ;switch register bytes
           34                              ;and output port bits
=0090      35    UP       =    SWITCH
=0091      36    LEFT     =    SWITCH+1
=0092      37    DOWN     =    SWITCH+2
=0093      38    RIGHT    =    SWITCH+3
=0094      39    SELECT   =    SWITCH+4
=0095      40    START    =    SWITCH+5
=0096      41    BBUT     =    SWITCH+6
=0097      42    ABUT     =    SWITCH+7
           43
           44    *illegal output combinations
=0005      45    ILLEGL1  =    %00000101  ;up&down
=000A      46    ILLEGL2  =    %00001010  ;left&right
           47
=0098      48    PARAM    =    $98
           49
=0098      50    UPPARA   =    PARAM
=0099      51    LPARA    =    PARAM+1
=009A      52    DNPARA   =    PARAM+2
=009B      53    RTPARA   =    PARAM+3
=009C      54    SEPARA   =    PARAM+4
=009D      55    STPARA   =    PARAM+5
=009E      56    BPARA    =    PARAM+6
=009F      57    APARA    =    PARAM+7
           58
=0000      59    SENSOR   =    $0
```

```
                    60
       =0000        61    SENSE0    =    SENSOR
       =0001        62    SENSE1    =    SENSOR+1
       =0002        63    SENSE2    =    SENSOR+2
       =0003        64    SENSE3    =    SENSOR+3
       =0004        65    SENSE4    =    SENSOR+4
       =0005        66    SENSE5    =    SENSOR+5
       =0006        67    SENSE6    =    SENSOR+6
       =0007        68    SENSE7    =    SENSOR+7
                    69
                    70   *configuration values
                    71
                    72   *AREA SELECT
       =0080        73    TURBO     =    %10000000    ;turbo mode
       =0000        74    NOTTRB    =    %00000000    ;not turbo mode
                    75
       =0070        76    AR123     =    %01110000    ;all 3 areas
       =0060        77    AR23      =    %01100000
       =0050        78    AR13      =    %01010000
       =0030        79    AR12      =    %00110000
       =0040        80    AR3       =    %01000000
       =0020        81    AR2       =    %00100000
       =0010        82    AR1       =    %00010000
                    83
       =0040        84    AND       =    %01000000
       =0080        85    OR        =    %10000000
                    86
                    87
                    88   *AREA DEFINITION
       =0000        89    POS       =    %00000000    ;position
       =0001        90    THRESH    =    %00000001    ;threshold
       =0002        91    POSVEL    =    %00000010    ;positive velocity threshold
       =0003        92    NEGVEL    =    %00000011    ;negative velocity threshold
                    93
       =0000        94    VELPL     =    $0           ;velocity thresholds
       =0000        95    VELMN     =    $0
                    96
                         ********************
                    98   * area threshold variables
       =0010        99    THLVL0    =    $10
       =0020       100    THLVL1    =    $20
       =0034       101    THLVL2    =    $34
       =0070       102    THLVL3    =    $70
                   103
                   104   *ZERO PAGE EQUATES
                   105   *area threshold storage
       =0060       106    THRHLD    =    $60
       =0060       107    THRESH0   =    THRHLD
       =0061       108    THRESH1   =    THRHLD+1
       =0062       109    THRESH2   =    THRHLD+2
       =0063       110    THRESH3   =    THRHLD+3     ;threshold level presets
                   111
                         ********************
       =9000       113    MAIN      =    $9000
                   114
                   115   *THRESHOLD SETS
008000: A9 10      116              LDA  #THLVL0
```

```
008002: 85 60        117           STA    THRESH0
008004: A9 20        118           LDA    #THLVL1
008006: 85 61        119           STA    THRESH1
008008: A9 34        120           LDA    #THLVL2
00800A: 85 62        121           STA    THRESH2
00800C: A9 70        122           LDA    #THLVL3
00800E: 85 63        123           STA    THRESH3
                     124
                     125   *output sets
                     126
008010: A9 01        127           LDA    #SENSE1
008012: 2A           128           ROL
008013: 2A           129           ROL
008014: 2A           130           ROL
008015: 09 83        131           ORA    #OR+SENSE3
008017: 85 90        132           STA    UP
008019: A9 01        133           LDA    #SENSE1
00801B: 85 91        134           STA    LEFT
00801D: A9 01        135           LDA    #SENSE1
00801F: 2A           136           ROL
008020: 2A           137           ROL
008021: 2A           138           ROL
008022: 09 83        139           ORA    #OR+SENSE3
008024: 85 92        140           STA    DOWN
008026: A9 03        141           LDA    #SENSE3
008028: 85 93        142           STA    RIGHT
00802A: A9 04        143           LDA    #SENSE4
00802C: 85 94        144           STA    SELECT
00802E: A9 05        145           LDA    #SENSE5
008030: 85 95        146           STA    START
008032: A9 06        147           LDA    #SENSE6
008034: 85 96        148           STA    BBUT
008036: A9 07        149           LDA    #SENSE7
008038: 85 97        150           STA    ABUT
                     151
                     152   *sensor parameter sets
                     153
00803A: A9 41        154           LDA    #AR3+THRESH
00803C: 85 98        155           STA    UPPARA
00803E: A9 71        156           LDA    #AR123+THRESH
008040: 85 99        157           STA    LPARA
008042: A9 11        158           LDA    #AR1+THRESH
008044: 85 9A        159           STA    DNPARA
008046: A9 71        160           LDA    #AR123+THRESH
008048: 85 9B        161           STA    RTPARA
00804A: A9 61        162           LDA    #AR23+THRESH
00804C: 85 9C        163           STA    SEPARA
00804E: A9 61        164           LDA    #AR23+THRESH
008050: 85 9D        165           STA    STPARA
008052: A9 41        166           LDA    #AR3+THRESH
008054: 85 9E        167           STA    BPARA
008056: A9 41        168           LDA    #AR3+THRESH
008058: 85 9F        169           STA    APARA
                     170
00805A: EA           171           NOP
00805B: 4C 00 90     172           JMP    MAIN
```

End Merlin-16 assembly, 94 bytes, errors: 0 , symbol table: $1800-$1A3E

Symbol table, alphabetical order:

|   | ABUT   | =$97  |   | AND     | =$40  |   | APARA   | =$9F   |   | AR1     | =$10   |
|---|--------|-------|---|---------|-------|---|---------|--------|---|---------|--------|
| ? | AR12   | =$30  |   | AR123   | =$70  | ? | AR13    | =$50   | ? | AR2     | =$20   |
|   | AR23   | =$60  |   | AR3     | =$40  |   | BBUT    | =$96   |   | BPARA   | =$9E   |
|   | DNPARA | =$9A  |   | DOWN    | =$92  | ? | ILLEGL1 | =$05   | ? | ILLEGL2 | =$0A   |
|   | LEFT   | =$91  |   | LPARA   | =$99  |   | MAIN    | =$9000 | ? | NEGVEL  | =$03   |
| ? | NOTTRB | =$00  |   | OR      | =$80  |   | PARAM   | =$98   | ? | POS     | =$00   |
| ? | POSVEL | =$02  |   | RIGHT   | =$93  |   | RTPARA  | =$9B   |   | SELECT  | =$94   |
| ? | SENSE0 | =$00  |   | SENSE1  | =$01  | ? | SENSE2  | =$02   |   | SENSE3  | =$03   |
|   | SENSE4 | =$04  |   | SENSE5  | =$05  |   | SENSE6  | =$06   |   | SENSE7  | =$07   |
|   | SENSOR | =$00  |   | SEPARA  | =$9C  |   | START   | =$95   |   | STPARA  | =$9D   |
|   | SWITCH | =$90  |   | THLVL0  | =$10  |   | THLVL1  | =$20   |   | THLVL2  | =$34   |
|   | THLVL3 | =$70  |   | THRESH  | =$01  |   | THRESH0 | =$60   |   | THRESH1 | =$61   |
|   | THRESH2| =$62  |   | THRESH3 | =$63  |   | THRHLD  | =$60   | ? | TURBO   | =$80   |
|   | UP     | =$90  |   | UPPARA  | =$98  | ? | VELMN   | =$00   | ? | VELPL   | =$00   |

Symbol table, numerical order:

|   | SENSOR  | =$00  | ? | SENSE0  | =$00  | ? | NOTTRB  | =$00   | ? | POS     | =$00   |
| ? | VELPL   | =$00  | ? | VELMN   | =$00  |   | SENSE1  | =$01   |   | THRESH  | =$01   |
| ? | SENSE2  | =$02  | ? | POSVEL  | =$02  |   | SENSE3  | =$03   | ? | NEGVEL  | =$03   |
|   | SENSE4  | =$04  | ? | ILLEGL1 | =$05  |   | SENSE5  | =$05   |   | SENSE6  | =$06   |
|   | SENSE7  | =$07  | ? | ILLEGL2 | =$0A  |   | AR1     | =$10   |   | THLVL0  | =$10   |
| ? | AR2     | =$20  |   | THLVL1  | =$20  | ? | AR12    | =$30   |   | THLVL2  | =$34   |
|   | AR3     | =$40  | ? | AND     | =$40  | ? | AR13    | =$50   |   | AR23    | =$60   |
|   | THRHLD  | =$60  |   | THRESH0 | =$60  |   | THRESH1 | =$61   |   | THRESH2 | =$62   |
|   | THRESH3 | =$63  |   | AR123   | =$70  |   | THLVL3  | =$70   | ? | TURBO   | =$80   |
|   | OR      | =$80  |   | SWITCH  | =$90  |   | UP      | =$90   |   | LEFT    | =$91   |
|   | DOWN    | =$92  |   | RIGHT   | =$93  |   | SELECT  | =$94   |   | START   | =$95   |
|   | BBUT    | =$96  |   | ABUT    | =$97  |   | PARAM   | =$98   |   | UPPARA  | =$98   |
|   | LPARA   | =$99  |   | DNPARA  | =$9A  |   | RTPARA  | =$9B   |   | SEPARA  | =$9C   |
|   | STPARA  | =$9D  |   | BPARA   | =$9E  |   | APARA   | =$9F   |   | MAIN    | =$9000 |

What is claimed is:

1. A method by which a person may play a game comprising:

providing a game device including a radiation transmitter fixed to the device;

transmitting infrared radiation from the radiation transmitter away from the device to create a detection field encompassing a volume of space substantially remote from the device and sufficient so that the person playing the game may put at least a part or extension of his body therein without contacting the device;

providing a radiation receiver which has a fixed position relative to the radiation transmitter and this position being one where the receiver can detect reflections of the infrared radiation from the part or extension of the person within the detection field;

moving at least a part or extension of the person to a position within the detection field without touching the device thereby causing infrared radiation to reflect off of the part of the person within the detection field toward the receiver;

receiving radiation reflected from the part of the person within the detection field by the radiation receiver;

determining the strength of the radiation reflected from the part of the person within the detection field; and triggering an action in the game corresponding to the strength of the reflected radiation, where the action of the game is represented by a response produced by the game device and discernable by the person.

2. The method of claim 1 further comprising the step of depicting the response visually.

3. The method of claim 1 where the radiation transmitter is mounted on a surface and the step of transmitting infrared radiation transmits radiation substantially perpendicularly away from the surface.

4. The method of claim 1 where, in the step of triggering, the action is triggered based on whether the strength of the reflected radiation is greater or less than a predetermined threshold.

5. The method of claim 1 further including, after the step of triggering, the step of repeating the above steps until the game is concluded.

6. An amusement device operable by a user without the user touching the device, comprising:

a first radiation transmitter for outwardly transmitting radiation away from the device to create a first detection field encompassing a volume of space substantially remote from the device and sufficient so that the user may put at least a part or extension of the user's body therein without contacting the device;

a first radiation receiver which has a fixed position relative to the first radiation transmitter for receiving a reflection of the outwardly transmitted radiation from the part or extension of the user within the detection field, and for producing a first signal corresponding to the strength of the received reflection; and an indicator, operably associated with the first radiation receiver and triggered by the first signal, for producing an indication that a part or extension of the user is within the first detection field.

7. The device of claim 6 further comprising:

a second radiation transmitter for outwardly transmitting radiation to create a second detection field encompassing a volume of space into which the user may put at least a part or extension of the user's body; and a second radiation receiver which has a fixed position relative to the second radiation transmitter for receiving a reflection of the outwardly transmitted radiation from the part or extension of the user within the second detection field, and for producing a second signal corresponding to the strength of the received reflection, where the indicator is also associated with the second radiation receiver, and is triggered by the first or second signal, for producing an indication that a part or extension of the user is within the first or second detection field.

8. The device of claim 7 where the first signal is produced when the strength of the received reflection at the first receiver is above a first predetermined threshold and where the second signal is produced when the strength of the received reflection at the second receiver is above a second predetermined threshold.

9. The device of claim 7 where the first radiation receiver is positioned adjacent the first radiation transmitter to receive reflections of the outwardly transmitted radiation traveling back toward the transmitter.

10. The device of claim 7 further including first and second collimators to limit the volume of space encompassed by the respective detection fields to a pair of substantially non-overlapping regions.

11. The device of claim 6 where the indicator includes a light and the indication is visual.

12. The device of claim 6 further including at least one collimator disposed adjacent to the transmitter or the receiver to limit the volume of space encompassed by the detection field to a predefined geometry.

13. The device of claim 6, where the indicator includes a display remote from the transmitter.

* * * * *